Aug. 28, 1951 V. K. SMITH 2,565,530
DYNAMOELECTRIC MACHINE AND METHOD OF MAKING SAME
Filed Nov. 2, 1950 8 Sheets-Sheet 2

INVENTOR.
VINCENT K. SMITH.
BY Oberlin E Limbach.
ATTORNEYS.

Aug. 28, 1951 V. K. SMITH 2,565,530
DYNAMOELECTRIC MACHINE AND METHOD OF MAKING SAME
Filed Nov. 2, 1950 8 Sheets-Sheet 3
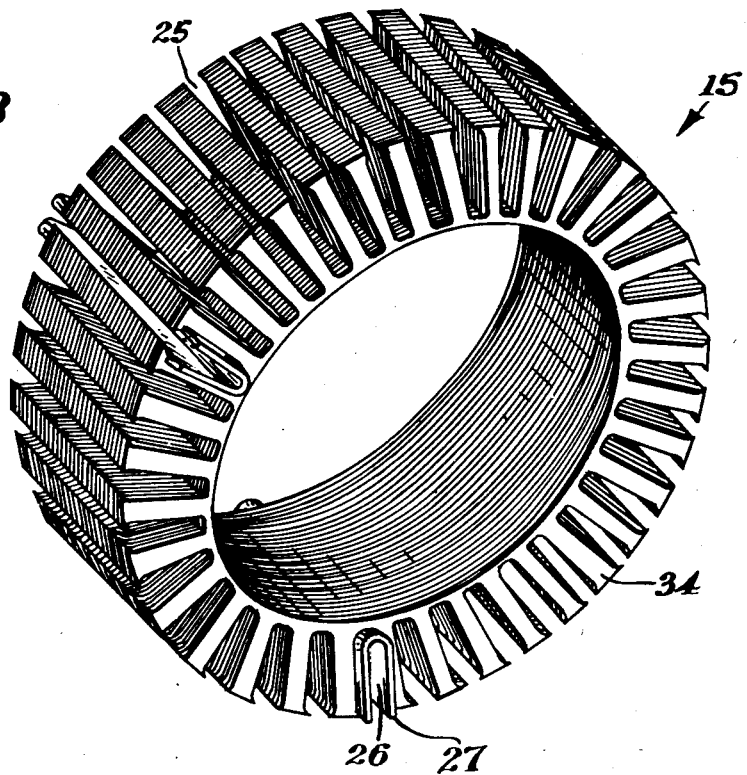
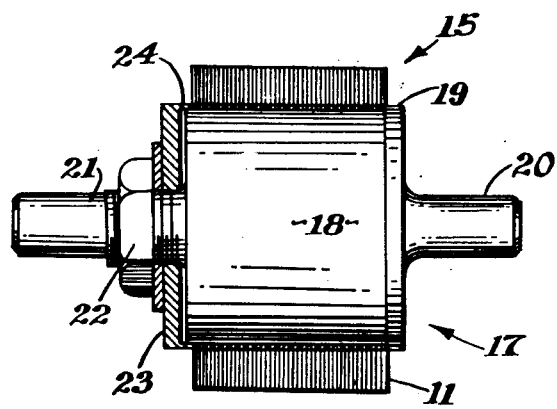
INVENTOR.
VINCENT K. SMITH.
BY Oberlin E Limbach
ATTORNEYS Aug. 28, 1951 V. K. SMITH 2,565,530
DYNAMOELECTRIC MACHINE AND METHOD OF MAKING SAME
Filed Nov. 2, 1950
8 Sheets-Sheet 4

INVENTOR.
VINCENT K. SMITH.
BY Oberlin E Limbach.
ATTORNEYS.

Aug. 28, 1951          V. K. SMITH          2,565,530
DYNAMOELECTRIC MACHINE AND METHOD OF MAKING SAME
Filed Nov. 2, 1950          8 Sheets—Sheet 5

INVENTOR.
VINCENT K. SMITH.
BY Oberlin & Limbach
ATTORNEYS

Aug. 28, 1951  V. K. SMITH  2,565,530
DYNAMOELECTRIC MACHINE AND METHOD OF MAKING SAME
Filed Nov. 2, 1950  8 Sheets-Sheet 6

INVENTOR.
VINCENT K. SMITH.
BY Oberlin E Limbach
ATTORNEYS.

Aug. 28, 1951 V. K. SMITH 2,565,530
DYNAMOELECTRIC MACHINE AND METHOD OF MAKING SAME
Filed Nov. 2, 1950 8 Sheets-Sheet 7
Fig.13
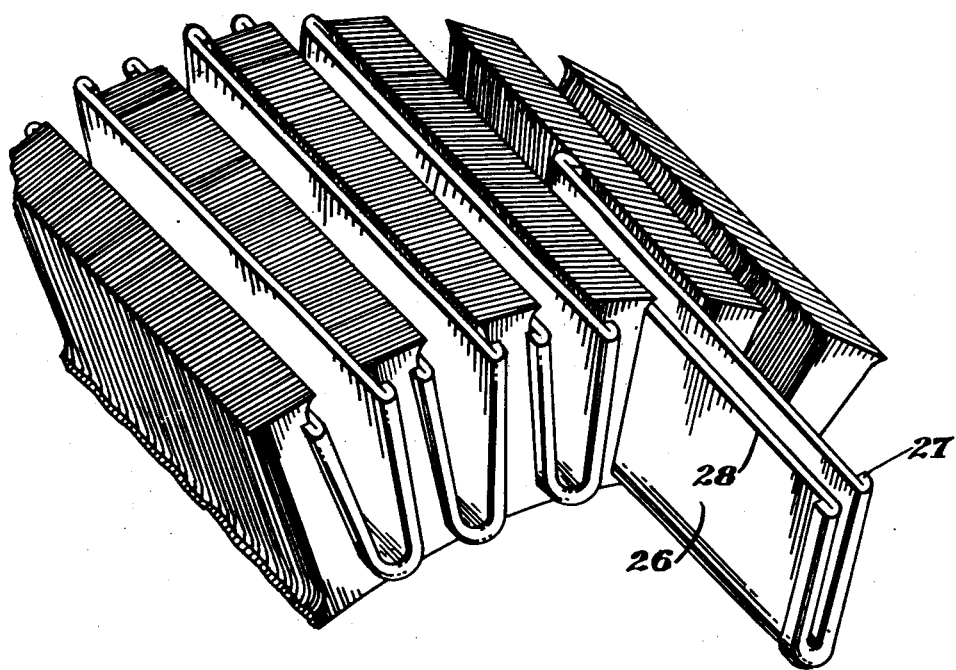
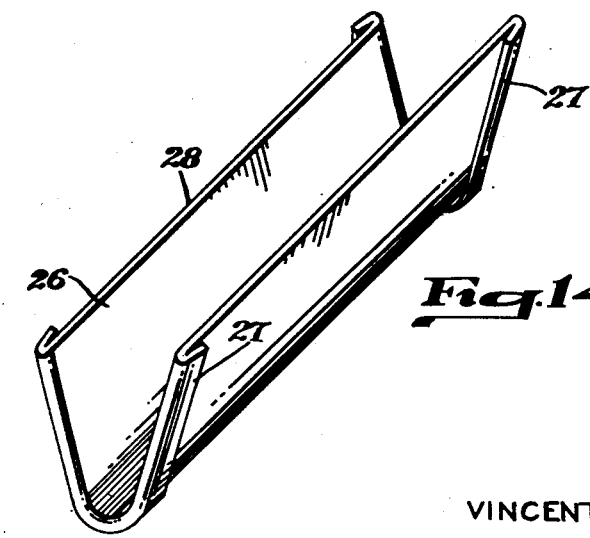
Fig.14
INVENTOR.
VINCENT K. SMITH.
BY Oberlin E Limbach
ATTORNEYS.

Aug. 28, 1951 V. K. SMITH 2,565,530
DYNAMOELECTRIC MACHINE AND METHOD OF MAKING SAME
Filed Nov. 2, 1950

INVENTOR.
VINCENT K. SMITH.
BY Oberlin E Limbach
ATTORNEYS.

Patented Aug. 28, 1951

2,565,530

UNITED STATES PATENT OFFICE 2,565,530

DYNAMOELECTRIC MACHINE AND METHOD
OF MAKING SAME

Vincent K. Smith, Gates Mills, Ohio

Application November 2, 1950, Serial No. 193,642

7 Claims. (Cl. 171—252)

This application is a continuation-in-part of my co-pending application, Serial No. 74,314, filed February 3, 1949, now abandoned.

This invention relates as indicated to dynamo-electric machines and methods of making the same and is concerned primarily with that portion of the machine commonly called the stator, which is a fixed laminated annular body of magnetic material carrying electrical windings in axially extending slots arranged in a substantially symmetrical relation on the inner periphery of the stator and particularly with the type of stator having a plurality of slots as commonly used in the construction of induction alternating current motors.

The art of building dynamo-electric machines has progressed by way of improvements in providing the stampings from which the laminated portions of the machine are constructed; in providing machines which automatically and at low cost place windings on the armature; and machines for performing other finishing operations such as those required in conjunction with the commutator. All of these improvements have resulted in a material reduction in the manufacturing cost of dynamo-electric machines which are produced in quantity. A serious bottleneck in such production procedure and one which has been responsible for a substantial portion of the cost of small size machines and particularly A. C. motors produced in quantity, is the labor required for the placing of the windings on the radially inwardly opening slots in the stator. While machines have been provided for purposes of automatically accomplishing this winding operation, such machines are of high cost and accordingly are not available to the small manufacturer and furthermore their operation of placing the stator windings has not been entirely successful, at least not as successful as the operation of machines capable of placing windings in slots which open radially outwardly, as for example in the armature of the machine.

It is a principal object of this invention to provide a dynamo-electric machine and particularly an A. C. motor construction in which the stator portion of the machine is so constructed and arranged that the slots for the reception of the stator windings are, during the step of placing such windings, radially outwardly opening so that the same general type of efficient low cost operation as has previously been used in winding coils or armatures may be employed in placing the stator windings as well.

It is a further and more particular object of this invention to provide a process for the construction of dynamo-electric machines which takes advantage of outwardly opening stator slots in the placing of the stator windings, so that the machine can be constructed at a considerably lower cost and with equipment which is largely automatic in its operation, to the end that the amount of manual labor required in the construction of a particular machine is reduced to a very minimum.

It is a further object of the invention to provide a dynamo-electric machine which may be thus constructed at a considerably reduced cost but whose performance characteristics are comparable with, and in certain respects superior to, the machines constructed in accordance with the prior art practices.

Other objects of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 5 is an illustration of the sheet illustrated in Fig. 3 after there has been stamped therefrom the element illustrated in Fig. 4;

Fig. 6 is a plan view of an element stamped out of the sheet shown in Fig. 5 as the next step in one form of the process for producing my machine, the element of Fig. 6 comprising the lamination used in building up the outer or yoke portion of the stator of my improved machine;

Fig. 7 is a side elevation view, partially in section, of a mandrel used in assembling the inner or winding receiving portion of the stator, the laminations of such element being shown in section in assembled relation on the mandrel;

Figure 9:
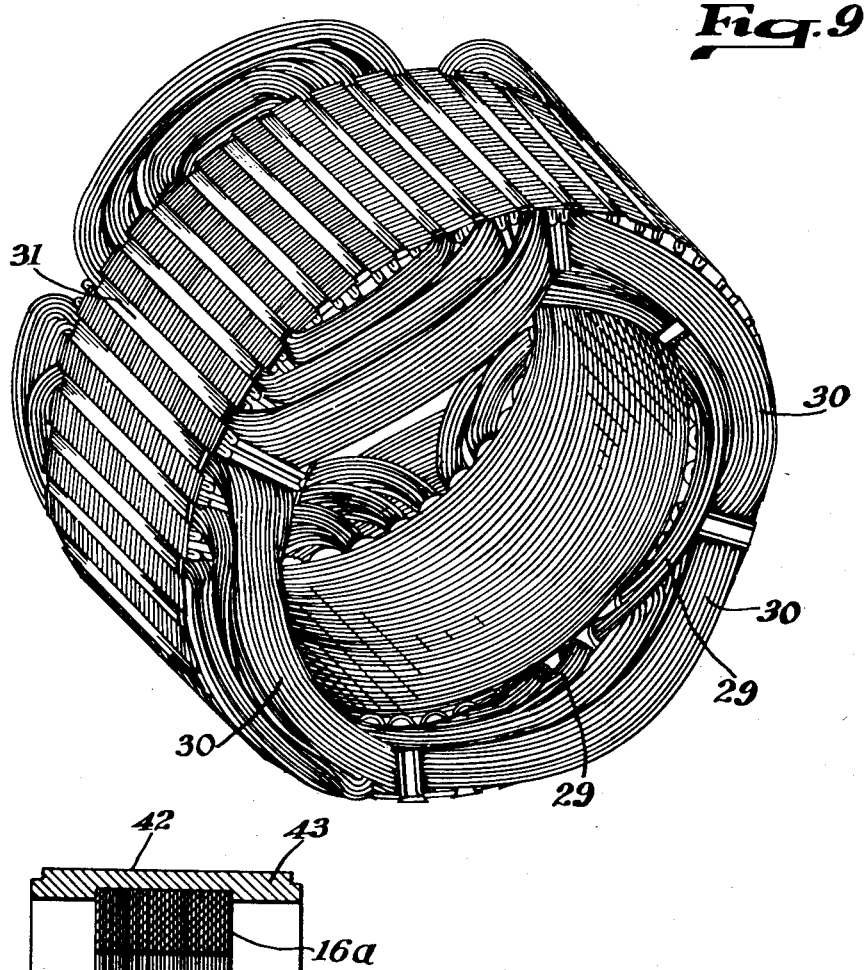
Figure 11:
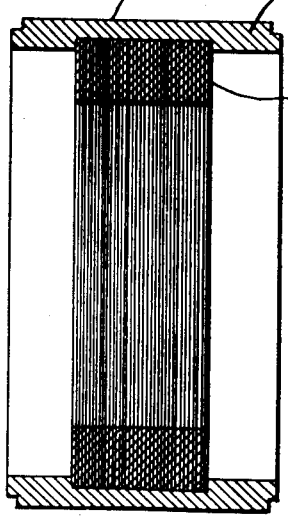
Figure 10:
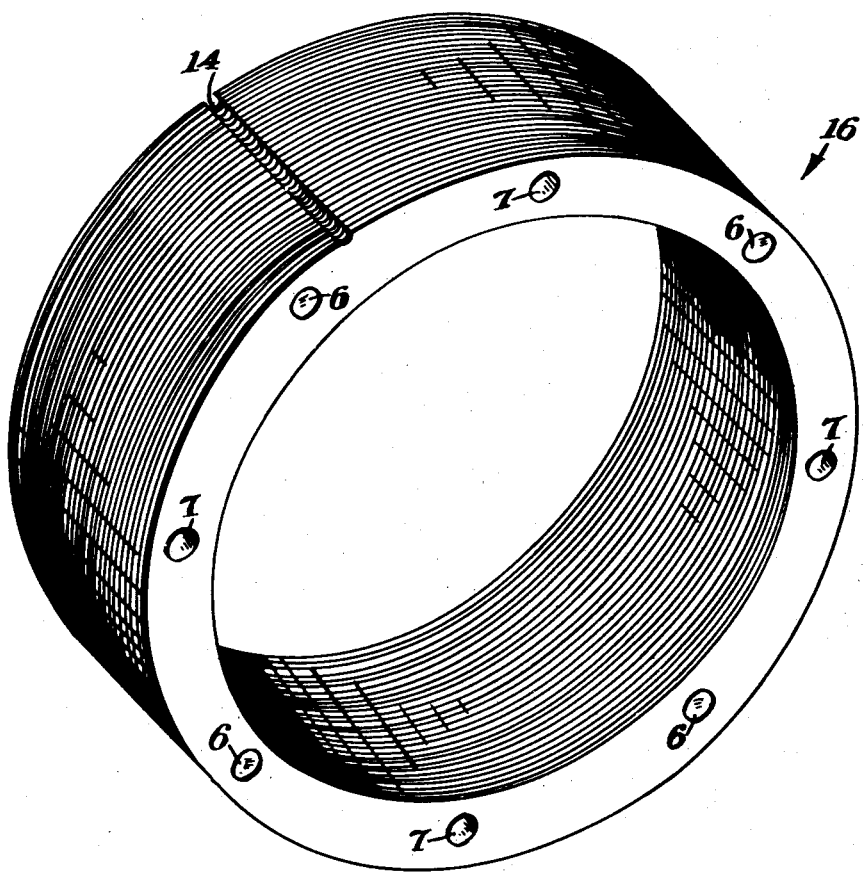
Figure 12:
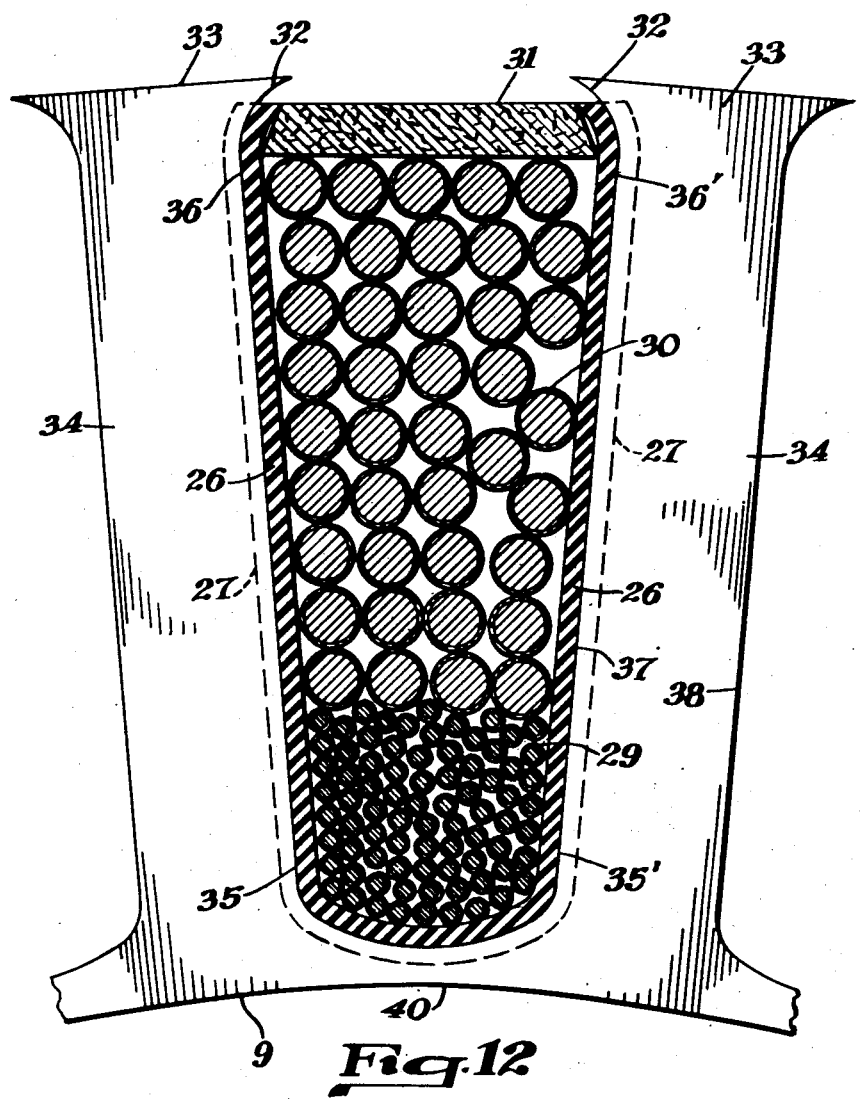
Figure 15:
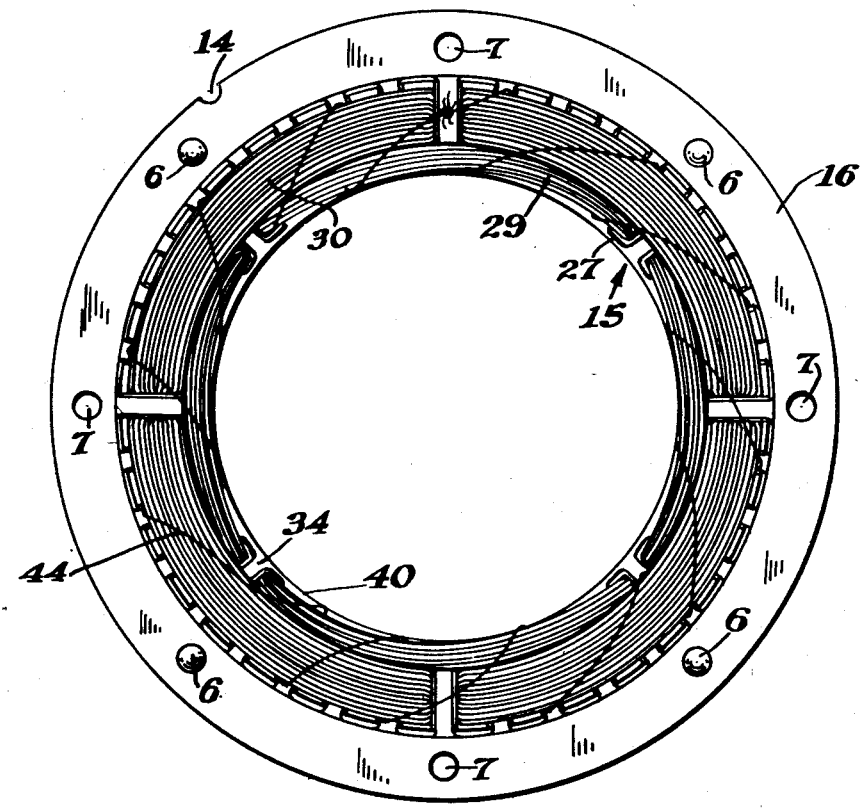

Fig. 8 is an isometric view showing a stack of laminations for the inner or winding receiving portion of the stator, sometimes referred to hereinafter as the spider, with two of the axial slots on the outer periphery thereof having insulation positioned therein, the assembly of Fig. 8 being a view showing the manner in which the laminations for this stator element are stacked on the mandrel as shown in Fig. 7 ready to receive the slot insulation and subsequently the windings;

Fig. 9 is a view of the same element as previously shown in Fig. 8 but which element has now had applied thereto stator and running windings for a 4-pole induction motor, such windings lying in the slots as illustrated, each of which slots has first positioned therein an insulating sheet and finally a wedging member compacting the windings in the slots;

Fig. 10 is an isometric view of an assembly of a plurality of laminations of the form illustrated in Fig. 6, which assembly in the illustrated form is held together by rivets and which may then serve as the outer yoke for the stator of my improved machine;

Fig. 11 is a longitudinal sectional view of an assembly of elements like that illustrated in Fig. 10, but in which instead of employing rivets for the purpose of holding the laminations in assembled relation, they are thus secured by being supported on the inner periphery of a metallic annulus cast in situ around the laminated assembly;

Fig. 12 is a fragmentary, part side elevational view of a portion of the assembly illustrated in Fig. 9 showing one complete slot of such assembly with the several windings and insulation and wedging member positioned therein, this figure being drawn to approximately ten times normal size for a ¼ horsepower motor;

Fig. 13 is a fragmentary isometric view of a portion of the assembly illustrated in Fig. 8 showing the manner in which the insulating members may be inserted in the winding receiving slots prior to the placement of the windings therein;

Fig. 14 is an isometric view of one of such insulating members in condition to be inserted in the slot of the assembly illustrated in Fig. 13; and Fig. 15 is an end view of a completed stator for a motor constructed in accordance with my invention, such assembly including the previously-wound inner member as illustrated in Fig. 9 supported on the inner periphery of an assembly such as that illustrated in Fig. 10 with the parts maintained in assembled relation entirely by a shrink-fit of the outer member on the inner member.

In carrying out the improved process of my invention I stamp from the sheet 1 a complete set of laminations required for both the armature and stator elements of the machine. The sheet 1 may be conventional sheet steel commonly used in making laminations for electric motors. One form of lamination for the armature element of the machine is generally indicated by the reference character 2 in Fig. 2 and one complete lamination for the stator portion of the machine is indicated at 3 in Fig. 3. My invention is not limited to any particular sequence of stamping operations whereby these several elements may be produced from a single sheet since a wide variety of sequence of steps is possible by which this objective may be attained. The character of the steel from which the lamination sheets are formed, its thickness, and the character of the die used are all factors which influence the precise sequence of steps which will be found to be most satisfactory for a particular operation.

In the drawings, there has been illustrated one sequence of steps which may be followed in producing a machine in accordance with my invention. The sequence, as illustrated by the drawings, comprises first providing a flat sheet 1 out of which there is first stamped those portions indicated in full lines in Fig. 1. The opening 4 is to accommodate the armature shaft of the finished machine. The openings 5 are the armature winding receiving slots and the openings 6 are for the purpose of receiving the rivets by which the outer or yoke portion of the stator is maintained in assembled relation prior to its being shrunk onto the inner wound portion of the stator. The openings 7 are for the purpose of receiving bolts which pass axially through the motor for the purpose of securing in assembled relation on the motor the end bells of the machine. It will be understood that when the yoke portion of the stator is maintained in assembled relation by means of a cast ring as illustrated in Fig. 11, then the openings 6 may be omitted.

Figure 1:
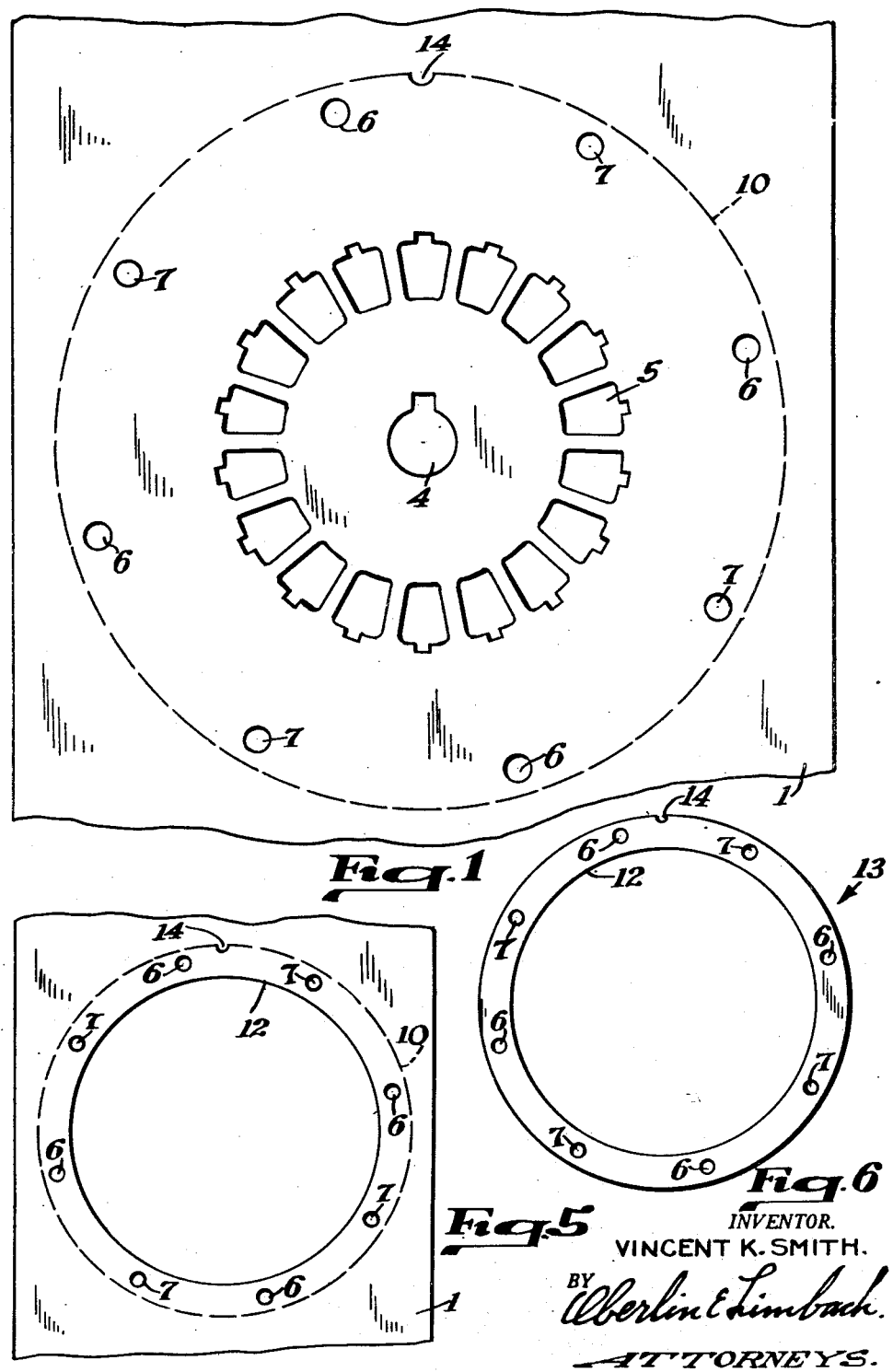
Fig. 1 is a fragmentary plan view of a thin flat sheet of magnetic material from which may be stamped several of the elements used in the construction of that embodiment of my invention illustrated by the machine shown in the other figures of the drawings; the full lines on this figure indicating those portions which are stamped from the sheet in the first step of my improved process.
Figure 2:
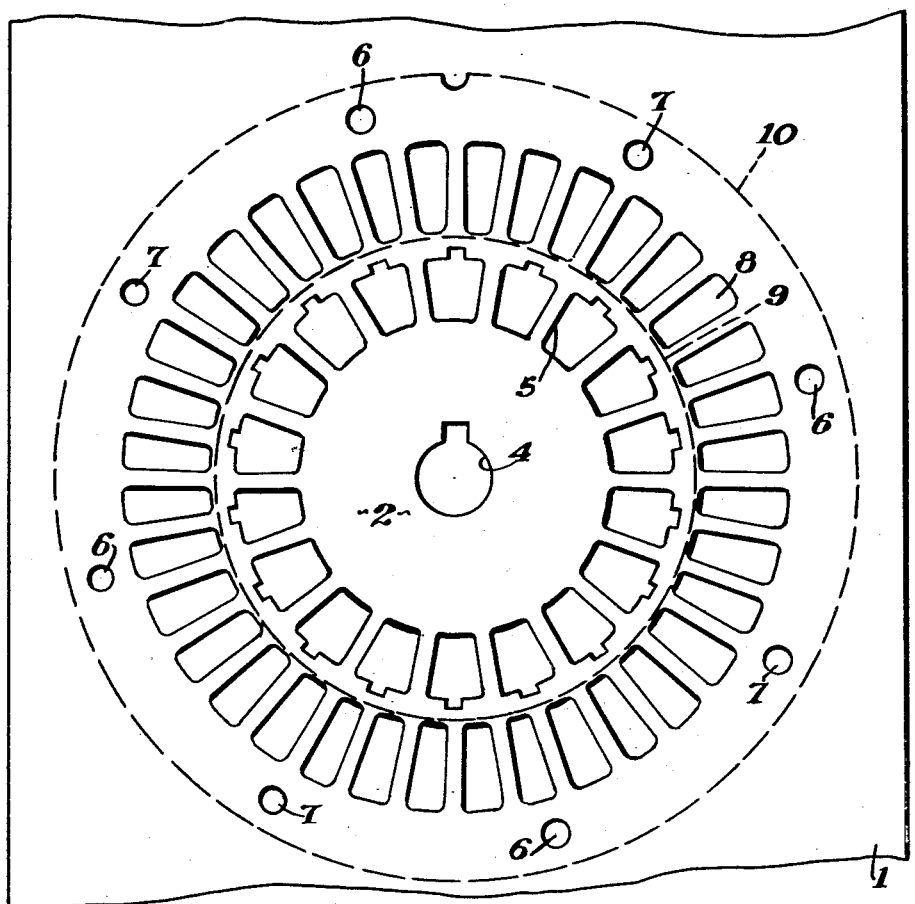
Fig. 2 is a view of the sheet illustrated in Fig. 1, but showing by the addition thereto of further lines, the stamping operation which is performed as the second step in the process of producing my improved machine.

After the sheet has been stamped in the manner illustrated in Fig. 1 it is next stamped to form therein a series of circularly arranged openings 8 arranged on a circle concentric with the circle on which the openings 5 are formed. The relative size and configuration of the openings 8 is critical and will be explained in greater detail hereinafter. The dash-line shown at 9 on Fig. 2 is the line along which the inner portion 2 is eventually cut out from the sheet 1 in removing from the sheet that portion which will eventually be used as an armature lamination. The dash-line 10 on Figs. 1 and 2 indicates the line along which the outer yoke member of the stator will eventually be cut from the sheet 1.

Figure 3:
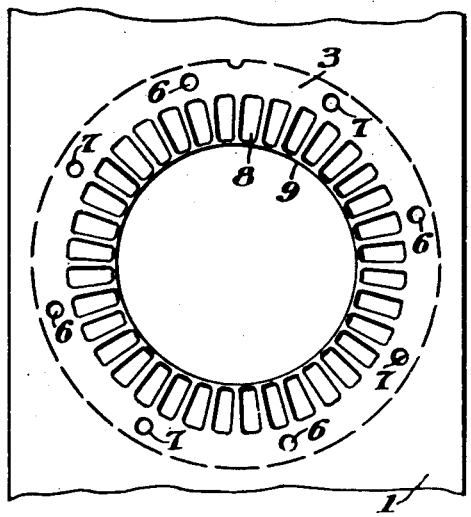
Fig. 3 is a view of the sheet shown in the previous figures, with the central portion thereof stamped out, thus illustrating the next succeeding step in one process of producing my improved machine.

After the openings 8 have been formed in the sheet, the center portion 2, which will eventually be used as an armature lamination, is then stamped therefrom along line 9 in the manner previously indicated leaving the sheet 1 in the condition illustrated in Fig. 3.

Figure 4:
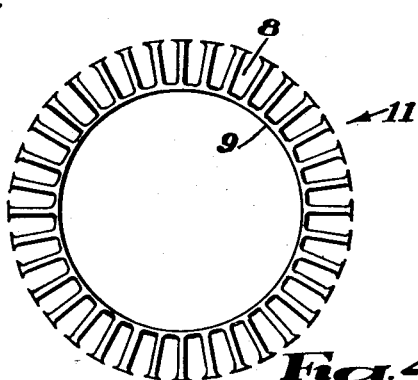
Fig. 4 is a plan view of an element which has been stamped out of the sheet as shown in Fig. 3 by the next succeeding step in one form of the process, the element of Fig. 4 comprising one lamination of the inner or winding receiving portion of the stator of my improved machine.

The next step in the illustrated sequence, comprising one method for the production of my motor, may be the stamping from the sheet 1, as illustrated in Fig. 3, of the part generally indicated at 11 in Fig. 4, that part being formed by die stamping out of the sheet 1 the element 11 on a circular line which includes the outer edges of the openings 8 so that the metal forming the outer boundary of the opening 8 in the sheet as illustrated in Fig. 3 becomes a portion of the circle generally indicated at 12 which is left after the element 11 is stamped out as most clearly illustrated in Fig. 5.

The stamping step just referred to, if performed in substantially flat-faced dies, will result in a radial flow of the metal lying on opposite sides of the circle 12 to the end that the outside diameter of the element 11 is finally slightly greater than the inside diameter of the opening as defined by the circle 12 in Fig. 5 from which the element 11 has just been severed. The next stamping operation which may be performed is to sever from the sheet 1, as illustrated in Fig. 5, the element generally indicated at 13 which is die-stamped from the sheet 1 along the line indicated by the circle 10. The dies employed for the purpose of stamping out the element 13 may likewise be substantially flat-faced dies and such stamping operation may result in a further reduction of the diameter of the circle 12. The dies employed for this stamping operation will be so formed as to provide a small notch 14 on the outer periphery of the element 13, this notch being used as a convenient means for aligning a plurality of stampings such as 13 in building up an assembly as illustrated in Fig. 10. Such alignment is necessary in order to insure that the openings 6 and 7 will be in alignment to receive the rivets and bolts.

By the sequence of steps just outlined, there are produced from a single sheet in addition to the central stamped out portion which may be used as an armature lamination, two elements 11 and 13 respectively illustrated in Figs. 4 and 6. By repeating the series of stamping operations just described, the necessary number of times, a sufficient number of elements such as 11 and 13 may be produced in order to build up the laminated stator portions generally indicated at 15 and 16 which are respectively formed from stacks of elements 11 and 13.

The formation of the inner stator portion and its completion ready for assembly with the outer yoke portion 16 will now be described.

A convenient manner in which to build up the laminated element 15 is to provide a mandrel generally indicated at 17 which has a central portion 18 having a diameter such as to have a sliding fit with the inner periphery of the elements 11. On one end this central portion 18 is provided with circumferentially extending shoulder 19, the radial extent of which is just slightly less than the wall thickness at the bottom of the slots of the elements 11 at the inner periphery thereof so that the flange 19 does not extend upwardly into such slots when the elements 11 are assembled thereon. Axles 20 and 21 extend from opposite ends of the central portion 18. The axle 21 is threaded adjacent the central portion 18 to receive a nut 22 which is employed to move axially against the stacked laminations 15, a removable plate 23 which has a flanged portion 24 adapted to telescopically engage the central portion 18 and thus bear against the stacked laminations and to force them against the shoulder 19. The outer diameter of the flange 24 is substantially the same as the outer diameter of the shoulder 19.

After the stack of elements 11 has been thus assembled into a stack generally indicated at 15, the stack, with the mandrel removed, will have the general appearance illustrated in Fig. 8, i. e., the openings 8 in the elements 11 are all placed in substantial alignment so as to provide on the periphery of the stack a plurality of circumferentially-spaced axially-extending slots generally indicated at 25 for the reception of the stator windings.

Prior to the placement of the stator windings in the slots 25, it will be best to place in such slots insulating members 26 of the character generally indicated in Figs. 13 and 14. These insulating members consist of a sheet of insulating paper which has been formed into a substantial U-shape with a cuff 27 formed on each end by folding back the terminal portion of the paper. This type of insulation unit is generally similar to that conventionally employed in armature slots and there are available on the market different types of machines, now used for the placement of similar insulators in the outwardly opening slots of armatures, which may be employed for the purpose of mechanically placing such insulators in the slots. These machines are generally of two types as determined by the manner in which the insulators are positioned in the slots. One form of such machines mechanically moves the insulators radially inwardly in such slots until the upper edges 28 of the insulators lie below the outer edge of the lamination bordering the slots, whereas another form of such machine inserts such insulators axially into the slots in the manner illustrated in Fig. 13. Either form of such machine may be used.

It will be understood, of course, that the operation of placing the insulators in the slots and the subsequent placement of the windings in the slots of the assembly as illustrated in Fig. 8 will all be performed while such assembly is supported on a mandrel in the manner illustrated in Fig. 7.

After the insulators have been placed in the slots, the next operation is to place the windings, and it is in this operation where the motor construction of my invention makes possible the realization of savings which have been heretofore impossible in that step which is responsible for the major labor cost in the construction of fractional horsepower motors. These windings which are to be placed in the slots 13 may be thus placed by machines of the general character heretofore used for winding armatures. Whereas in winding an armature, the windings are generally arranged symmetrically by the winding as it leaves one slot in each instance spanning substantially the same central angle before it enters the next slot; in the placement of the stator windings, a different procedure is followed in that the windings are placed symmetrically about the pole axis, as most clearly illustrated in Fig. 9 for example, when winding a 4-pole machine. The particular form of machine used for the placement of the windings in the assembly, illustrated in Fig. 9 for example, differs from a conventional armature winding machine therefore primarily in the form of the head which is commonly employed in such machines for guiding the wire from the flyer arm into the slot and the indexing means by which such flyer causes the winding to be laid in a particular pair of slots. Since the form of such a machine is no part of the present invention, it is believed unnecessary to consider further the various forms which such machine may take.

The form of stator winding illustrated in Fig. 9 is for a 4-pole single phase machine having a start winding and a running winding. The start windings are generally indicated by 29 and are arranged in the bottom of the slots and are distributed with respect to the pole axis of the machine in a conventional manner. The running windings generally indicated at 30 are laid in the slots and where such running windings occupy the same slot as a starting winding, they are usually placed on top, that is, radially outwardly of the starting winding. As previously indicated, the windings are placed in the slots of the assembly as illustrated in Fig. 9 while such assembly or stack of laminations 11 is supported on a mandrel in the general manner illustrated in Fig. 7. After the windings have been thus laid in the slots, there may be next inserted in each slot a wedge 31. These wedges 31 are wide enough as illustrated in Fig. 12 to be retained against radial displacement out of the slots by the inwardly-extending edges 32 of the lamination stack along the outer margin of each of the slots. The wedges 31 preferably extend axially slightly beyond the outermost lamination in the stack. While for purposes of clarity in illustrating the construction of the motor, the wedges 31 have been shown inserted before the yoke is shrunk on the spider, I prefer in actual practice to wait until after the yoke has been shrunk on the spider before inserting the wedges. This preferred procedure has a tendency to produce a slightly tighter and more secure final assembly.

By having more particular reference to Fig. 12 it will be observed that there is illustrated in substantially 10-times normal size the slot and adjacent teeth and bridge structures of the inner stator part of a stator which may be used for example in a ¼ horsepower motor. The following dimensions are given as an example, they being the dimensions used in the construction of successful commercial motors made in accordance with my invention.

The radial distance from the circle 33 to the circle on which lie the outer ends of the teeth 34 is approximately 0.7 inch. The radial thickness of the bridge 40 joining adjacent teeth 34 is about 0.03 inch. The radius of the circle 9 is about 1.83 inches. The width of the slot between the teeth 34 at about the points indicated by 35 and 35' is about 0.197 inch and the width of the slot between the teeth at the points indicated by 36 and 36' is about 0.294 inch. The teeth have a uniform width, i. e., the distance between lines 37 and 38 is about 0.138 inch with lines 37 and 38 parallel throughout the major portion of their extent, that is, from point 35' to point 36'.

The dimension of the bridge 40, particularly its radial dimension at its thinnest point is critical for best performance characteristics of the resultant machine. The two factors which determine the radial thickness of the bridge 40 are the performance characteristics of the resultant machine and the structural strength required of the bridge in order to withstand the great stresses imposed thereon during the shrink-fit of the outer stator yoke on the inner member which carries the windings.

It has been found that an entirely satisfactory fractional horsepower motor which meets both requirements above-outlined, will be produced when the dimensions of the several parts are as given above and when no means other than the windings and insulation sheaths included as necessary elements in the construction of the machine are relied upon for the purpose of maintaining the inner winding carrying spider in assembled relation not only as between the component laminations thereof, but also with respect to the outer yoke.

It has been found that the radial depth of the bridge 40, in order to provide sufficient physical strength to the spider, should be not substantially less than about .027 inch. As previously indicated, the maximum thickness of the bridge, at its thinnest point, is determined by the electrical characteristics of the machine. A satisfactory performance was secured on a machine wound as illustrated in the previous figures with a bridge thickness at its center of about .030 inch. As that dimension is increased, without any change in the windings, it will be found that the power factor characteristics of the machine are adversely effected. The use of a slightly thicker bridge should be accompanied by an adjustment in the windings so as to maintain excessive flux saturation in the bridge in order to maintain the power factor of the machine at the proper level.

I have found that for a radial thickness of bridge of about .030 inch in the center thereof, the overlap between the outside diameter of the spider and the inside diameter of the yoke should be on the order of about .004 inch. This will provide a gripping effect sufficient to maintain the spider in assembled relation in the yoke without exerting excessive pressure on the bridge which would cause it to fail structurally. The dimensions given above are those which will be found best suited to a ¼ horsepower 4-pole single-phase motor. As the size of the motor is increased, that is, the radial depth of the entire spider and the radial depth of the entire yoke of the stator are correspondingly increased, the radial depth of the bridges and the amount of overlap between the outside diameter of the spider and the inside diameter of the yoke may not be correspondingly increased. It should be noted, however, that in the larger size motors there is a greater possibility for the employment of additional windings so that a high saturation of flux in the bridge may be maintained thus it is possible to use a thicker radial bridge in the larger motors and still keep the power factor of the motor at the desired level.

The shape of the connecting bridge between adjacent teeth is also of importance. At this point, it should be noted that the dimensions given above have referred to the bridge at its thinnest point at the center of the slot. By having a substantial fillet in each of the bottom corners of the slot, it is possible to reduce the radial dimension of the bridge at its center to the lowest possible amount. A fillet which has been found to be entirely satisfactory is that produced by extending outwardly from each side of a radial line, passing through the center of the slot an arc of a circle whose center lies on such centerline and whose radius is about 0.17 inch. That arc is extended until it meets the arc of a circle tangent to the straight side wall 37 of the slot and has a radius of about .032 inch, such last-named fillet arc being drawn from a point which lies on a circle having a radius of about 0.08 inch greater than the radius of the circle 9. These fillets in the lower corners of the winding receiving slots are important when it is desired to use a minimum radial thickness of bridge 40 since it will be observed that the shrink-fit in the manner hereinafter described of the outer yoke on the winding carrying spider results in compressive forces directed substantially radially inwardly and concentrated on radial lines substantially on the centerline of the teeth 34.

After the windings have been placed on the spider assembly, and with the wedges left out to be inserted after the yoke has been shrunk on the spider, it will be found that the mandrel 17 may be removed and the thus assembled spider unit is a rigid structure capable of withstanding without deformation, during all of the normal handling, the stresses to which it will be subjected during the remaining steps of fabricating the completed motor. It has been found that no rivets, clamps, or other means such as thermoplastic cements and the like need be employed for the purpose of holding the wound spider in assembled relation either prior to or subsequent to its incorporation by shrink-fit inside of the outer yoke.

The placement of the windings in outwardly opening slots, whether this be done manually and especially when it is done with a machine, makes possible a tightening of the end turns of the winding sufficiently to enable the windings, in conjunction with the insulators, to hold the laminated spider in assembled form even after the mandrel 17 has been removed.

It will be found preferable to remove the mandrel prior to shrinking the outer yoke on the spider. It is preferred to use a solid mandrel since, in this way, there is less chance for the parts to become misaligned although an expansible mandrel may be used if it is sufficiently rigid to hold the several laminations 11 in proper alignment not only during their initial stacking on the mandrel, but also during the subsequent placement of the insulation and windings. When a solid mandrel is used it is much preferred to remove it from the wound spider assembly before the yoke is shrunk onto the spider, since it has been found that the shrinking of the yoke results in a slight uniform and symmetrical decrease in the inside diameter of the spider and for best results the shrinking operation should be performed while the spider is thus permitted to have its inside diameter decreased since, in this way, not only the teeth but also the bridge structure between the teeth are placed under resiliently opposed stress which helps to insure that the spider will be maintained in assembled relation in the motor due to the gripping effect of the yoke throughout the life of the machine. The insulating members 26 preferably extend axially beyond the end laminations in the assembled stack 15 for a distance of about $\frac{3}{32}$ to $\frac{1}{8}$ inch in order to insure that the windings in their placement and during use of the motor will not be chafed so as to remove the insulation therefrom and short circuit the windings. The reinforcement of the ends of such insulators as by the cuffs 27 assists such insulators further in thus holding the windings in proper position and without chafing.

The fabrication of the elements 13 as illustrated in Fig. 6 into a unit of the type illustrated in Fig. 10 is a relatively simple operation. This is conveniently performed by providing a suitable fixture on which the laminations 13 may be stacked and then placed in a press which first compacts the stack and then peens over the rivets used to hold the stack in assembled relation.

As previously indicated, instead of securing the stack 16 in assembled relation in the manner just described, the expedient illustrated in Fig. 11 may be utilized. The structure of Fig. 11 is produced by having the stack 16a of yoke laminations clamped in a die-casting machine and the annulus 43 then cast thereon. The annulus 43 will have an outer peripheral contour 42 of the size and shape desired in the final machine.

As previously indicated, the stamping of the elements 11 and 13 from contiguous portions of the same flat sheet results not only in a saving of raw material, die cost and overall cost of manufacture, but assures also that the deformation of the metal will result in the unit 16 having a slightly smaller inside diameter than the outside diameter of the unit 15. This difference in diameters is sufficiently great to provide the overlap of about 0.004 inch referred to above so that while the two parts are at the same temperature, the unit 15 may not be inserted in the yoke 16 except by the application of such force as would damage the unit 15 to the extent that it would be no longer useable. In accordance with my invention, however, I establish a temperature differential between the units 15 and 16, preferably by heating the yoke 16 or chilling the unit 15 or both, so that the resultant inside diameter of the unit 16 is sufficiently greater than the outside diameter of the unit 15 to permit the two parts to be brought into telescopic assembled relation without the application of force.

As the parts are permitted to reach the same temperature, the shrinking force exerted by the yoke on the spider is tremendous. As previously indicated, that shrinking force is sufficient to actually cause a slight decrease in the inside diameter of the spider, a condition which is responsible largely for the spider, even though of relatively flimsy physical strength, to be held in the yoke without the use of any other securing means. This tremendous pressure exerted by the edges of the laminations of the yoke against the edges of the laminations of the spider insures further a reduction to a very minimum of the reluctance across this area. While no conscious effort need be made to insure any particular and absolutely critical alignment between the yoke and spider during the shrinking operation, it is necessary only to observe the care usual in the mass production of machines of this kind. In other words, it is necessary only to keep the ends of the yoke and spider lamination stacks substantially flush as the parts are permitted to reach the same temperature. There is apparently a sufficient misalignment between the laminations of the yoke and spider so that the entire body of the stator resulting from the shrink-fit operation has a mechanical strength in excess of that required by all normal useage and this result is achieved without the use of clamping means, bolts, thermoplastic cement or the like. Unexpectedly this misalignment between the yoke and spider laminations does not interfere in a practical manner with the electrical characteristics of the machine.

After the yoke is thus shrunk on the spider, the entire assembly may be dipped, if desired, in a light varnish which will waterproof the machine and assist in insuring complete insulation of the windings.

After the yoke and spider have been assembled in the manner indicated, the assembled structure will have the appearance as indicated generally in Fig. 15. In this figure, it will be noted that the end turns of the windings have been tied by cords such as 44 as is common practice in the construction of machines of this kind. These ties may be placed on the windings at any stage after the spider has been wound. It is perferable, however, to do this tying operation before the shrink-fit operation since, in this way, the windings are further protected against flexure which might result in a chafing or other damage to the insulation on the windings during assembly.

It is believed unnecessary to describe further the operations necessary for the fabrication of a complete motor. It is sufficient to note that the openings 7 which are available in the assembly as illustrated in Fig. 15 make possible the passing therethrough of the bolts necessary to hold the end bells of the machine on opposite ends of the stator. These end bells, as in conventional construction, will support the entire armature assembly of the machine.

The placing of the wedging members 31 in the slots of the wound stator is an important feature of this invention. By forming the stator in accordance with the principles of my invention, the windings are, by the placement thereof, compacted in the bottom of the slots so that the wedges may be placed in the slots by machine by a mass operation and thus the placement of such wedging members is greatly facilitated. They also have the effect of compacting the stator windings in the bottom of the slots wherein they are placed, thus bringing such windings into the closest possible proximity to the armature and thus improving the electrical characteristics of the machine.

By using the laminated structure of my improved machine it is possible to reduce the amount of "copper," that is, the total amount of copper in the windings, as compared with a conventional machine, by as much as 15%. The factors which are principally responsible for such reduction in copper are the following. First, the compacting of the windings in the body of the slots, that is, toward the center of the machine, reduces the total amount of copper needed; and second, by the provision of outwardly opening slots permitting machine winding it is possible to considerably reduce the amount of copper in the end turns in that the end turns, arranged in a compact fashion, do not extend away from the laminated body as far as in a conventional machine.

This last-named advantage is of particular importance in that the same results in a considerable saving of material while at the same time increasing the efficiency and performance characteristics of the machine. By this new construction and I believe largely because of the indicated saving in copper and of course the provision of ventilation openings through the stator by means of the slots, motors constructed in accordance with my invention have been observed to operate as much at 10° cooler than conventionally constructed machines of the same size.

When following the procedure which constitutes my invention, as above explained, in producing a motor of the characteristic described, and especially in producing single-phase, alternating current fractional horsepower motors which constitute the large bulk of all motors manufactured because they are used generally for domestic installations of all kinds, the following are some of the principal advantages over all of the prior art methods of making motors of this kind.

These advantages can generally be classified as, first, economies of manufacture, and, second, improvements in the operational characteristics of the motor.

The economies of manufacture accrue largely from the fact that (a) the procedure of assembling the complete motor of my invention is so simple that the total assembly cost is not materially greater than the cost of assembling conventional motors of the prior art; (b) the procedure for the placement of the stator windings can be accomplished easily and economically with a simple type of machine which is low in cost, easy to maintain and flexible in its operations so that no substantial costs are involved in setting up the machine to produce a particular type of motor; (c) a substantial saving of material is effected particularly in the reduction in the size of the end turns of the windings; and (d) of greater importance is the further fact that both the starting and running windings may be machine wound. In some types of motors constructed according to my invention, both start and running windings may be wound simultaneously.

From the standpoint of improved operational characteristics, I may mention first that the electrical performance of my improved motor will be found to be generally as good or superior to motors constructed by conventional practice and, second, because the windings are compacted in the lower ends of the slots a two-fold advantage is secured in that the stator windings are brought as close as possible to the armature and spaces are left above such windings which extend through the motor and provide ducts for the circulation of cooling air which in addition to the lower copper losses in the shorter end turns results in the motor operating at a definitely lower temperature.

Other modes of applying the principle of the invention may be employed, change being made as regards the details described, provided the features stated in any of the following claims or the equivalent of such be employed.

I, therefore, particularly point out and distinctly claim as my invention:

1. A dynamo-electric machine stator comprising an inner axially laminated annulus having outwardly extending radial projections thereon defining axially extending winding receiving slots, the inner portion of said annulus having a cylindrical bore adapted to embrace a rotor in close running clearance and having a radial depth substantially less than the radial extent of said projections, insulated windings in said slots, an outer cylindrical axially laminated annulus having a normal inside diameter slightly less than the cylinder which includes the outer ends of the radial projections on said inner annulus, said annuli being in shrink-fit telescopic assembled relation by having been brought into such relation while said outer annulus was at a temperature sufficiently greater than the inner annulus to make possible the bringing of said annuli into telescopic relation without the application of force, said inner winding supporting annulus maintained in assembled relation substantially entirely by the binding effect of said insulated windings and the gripping effect thereon of said outer annulus.

2. A structure as defined in claim 1 in which the radial depth of said cylindrical bore at the thinnest point is about 0.030 inch.

3. A structure as defined in claim 1 in which the normal outside diameter of the inner annulus, prior to shrink-fit thereon of said outer annulus, is about 0.004 inch greater than the normal inside diameter of said outer annulus.

4. A structure as defined in claim 1 in which the radial depth of said cylindrical bore at its thinnest point is about 0.030 inch and in which the normal outside diameter of the inner annulus, prior to shrink-fit thereon of said outer annulus, is about 0.004 inch greater than the normal inside diameter of said outer annulus.

5. The method of producing a dynamo-electric machine stator which comprises stamping from each of a plurality of similar thin sheets of magnetic material a similar pair of radially contigtious flat annuli, such stamping operation so deforming the work that after stamping, the outside diameter of the smaller of each such pair of annuli is slightly greater than the inside diameter of the larger of such pair of annuli, forming in the outer periphery of the smaller of each such pair of annuli a plurality of circumferentially spaced notches, stacking such smaller annuli in axial alignment with said circumferential notches in substantial alignment to provide winding receiving slots on the outer periphery of the assembly, placing insulated electrical windings in said slots so as to maintain said stack of smaller annuli in assembled relation without other support, stacking the larger of each such pair of annuli in axial alignment to provide a laminated substantially cylindrical assembly, establishing a temperature difference between the two assemblies so that the larger has the higher temperature, and then bringing such differentially heated assemblies into telescopic assembly.

6. The method of producing a dynamo-electric machine stator which comprises providing an annular axially laminated yoke having a cylindrical inner surface, providing an axially laminated spider annulus having circumferentially spaced axially extending winding receiving slots on its outer periphery and having an outside diameter slightly greater than the inside diameter of the yoke, placing the pole windings in the outwardly opening slots of the spider in a sufficiently tightly wound condition to maintain the spider in assembled relation without other support, then shrinking the yoke on the spider by first having the yoke at a temperature higher than the spider, then bringing the yoke and spider into telescopic assembly, and then permitting the parts to reach the same temperature whereby the spider is maintained in assembled relation substantially entirely by the gripping effect of the windings and yoke.

7. The method of producing a dynamo-electric machine stator which comprises providing an annular axially laminated yoke having a cylindrical inner surface, providing an axially laminated spider annulus having circumferentially spaced axially extending winding receiving slots on its outer periphery and having an outside diameter slightly greater than the inside diameter of the yoke, placing the pole windings in the outwardly opening slots of the spider in a sufficiently tightly wound condition to maintain the spider in assembled relation without other support, then shrinking the yoke on the spider by first having the yoke at a temperature higher than the spider, then bringing the yoke and spider into telescopic assembly, then permitting the parts to reach the same temperature whereby the spider is maintained in assembled relation substantially entirely by the gripping effect of the windings and yoke, and then inserting wedges in the winding receiving slots outwardly of the windings thereof to compact the wir ings in the bottom of such slots and assist in maintaining the spider in a similar relation in the yoke.

VINCENT K. SMITH.

No references cited.